(12) United States Patent
Izuhara et al.

(10) Patent No.: US 12,210,265 B2
(45) Date of Patent: Jan. 28, 2025

(54) INTEGRATED THIN OPTICAL BEAM SCANNER

(71) Applicant: SCIDATEK INC., Austin, TX (US)

(72) Inventors: Tomoyuki Izuhara, Pleasanton, CA (US); Junichiro Fujita, Los Altos, CA (US); Louay Eldada, Austin, TX (US)

(73) Assignee: SCIDATEK INC., Austin, TX (US)

( * ) Notice: Subject to any disclaimer, the term of this patent is extended or adjusted under 35 U.S.C. 154(b) by 334 days.

(21) Appl. No.: 17/743,972

(22) Filed: May 13, 2022

(65) Prior Publication Data

US 2023/0367174 A1 Nov. 16, 2023

(51) Int. Cl.
  *G02F 1/295* (2006.01)

(52) U.S. Cl.
  CPC ...... *G02F 1/2955* (2013.01); *G02F 2201/302* (2013.01)

(58) Field of Classification Search
  CPC .... G02F 1/2955; G02F 2201/302; G02F 1/29; G02F 1/291; G02F 1/292; G02F 1/295; G02B 6/12009; G02B 6/29301; G02B 27/0087
  See application file for complete search history.

(56) References Cited

U.S. PATENT DOCUMENTS 10,444,596 B1 * 10/2019 Wu ................... G02B 6/12004
11,150,411 B2   10/2021 Hosseini et al.

OTHER PUBLICATIONS

Daisuke Inoue, Tadashi Ichikawa, Akari Kawasaki, and Tatsuya Yamashita, Demonstration of a new optical scanner using silicon photonics integrated circuit, Optics Express 2499, vol. 27, No. 3, Feb. 4, 2019.
Bahram Jalali, Silicon-on-Insulator Photonic Integrated Circuit (SOI-PIC)Technology, Optoelectronic Circuits and Systems Laboratory Electrical Engineering Department, Downloaded From: http://proceedings.spiedigitallibrary.org/ on Feb. 19, 2016.
Sangsik Kim, Daron A. Westly, Brian J. Roxworthy, Qing Li, Alexander Yulaev, Kartik Srinivasan & Vladimir A. Aksyuk, Photonic waveguide to free-space Gaussian beam extreme mode converter, Light: Science & Applications vol. 7, Article No. 72 (2018).
B. G. Lee et al., "Monolithic Silicon Integration of Scaled Photonic Switch Fabrics, CMOS Logic, and Device Driver Circuits," in Journal of Lightwave Technology, vol. 32, No. 4, pp. 743-751, Feb. 15, 2014, doi: 10.1109/JLT.2013.2280400.

* cited by examiner

*Primary Examiner* — John Bedtelyon
(74) *Attorney, Agent, or Firm* — Pierson IP, PLLC

(57) ABSTRACT

An optical beam scanning semiconductor device includes 1×N electrically controlled, integrated optical switch matrix and specifically designed integrated optical grating output couplers at each of N output waveguides of 1×N switch. By selecting one of the N outputs of the 1×N switch as the output of the input optical signal, an optical output beam scans in free space. Variation in the grating output coupler design enables a smart scanning device with multiple controllable beam characteristics.

18 Claims, 8 Drawing Sheets

INTEGRATED THIN OPTICAL BEAM SCANNER

FIELD OF THE INVENTION

The present embodiments generally relate to free space optical energy transfer. In particular, they relate to the spatial scanning of free-space optical beams as to aim the beams and transfer their optical energy to a target wirelessly while minimizing the energy density loss. Further, the optical beam scanners have a flat form factor for integration into consumer handheld devices such as cell phones, tablets, smart watches, and laptop computers. Some of the potential applications are high-speed communication, energy transfer, and sensing.

BACKGROUND

Optical beams are a form of optical energy flow in a defined space. Generally, the beam is emitted from an optical system with an optical source and optics with a defined shape of optical power profile and propagates in space toward a certain direction without spreading extensively. Optical beams are useful for various applications since the optical energy can be transferred to a target wirelessly without losing the energy density. Some of the potential applications are communication, energy transfer, and sensing. For example, in optical wireless communication, it is required to transfer a certain optical energy from the sender of the signal to the receiver in order to achieve a specific data rate for communication. For this reason, the beam form optical signal can achieve higher data rate and longer distance at higher efficiency compared to a system using a widely diverging optical signal, which requires very high power at the optical source or suffers a short distance limitation. The use of an optical beam is very common in long distance, free-space optical communication systems utilizing a lens system to collimate the optical signal energy. For optical energy transfer, it is beneficial to have optical energy flow in a beam to achieve higher transfer efficiency. For optical sensing applications, beam-form optical signals provide benefits such as high spatial resolution of targeted sensing, higher sensitivity, and long-distance sensing.

Although the use of optical beams is common in these applications, often the optical systems that handle beams are conventional lens-based optical systems. Lens-based systems are bulky and expensive to assemble. The present embodiments solve both problems by utilizing recent developments in photonic integrated circuit based optical systems.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
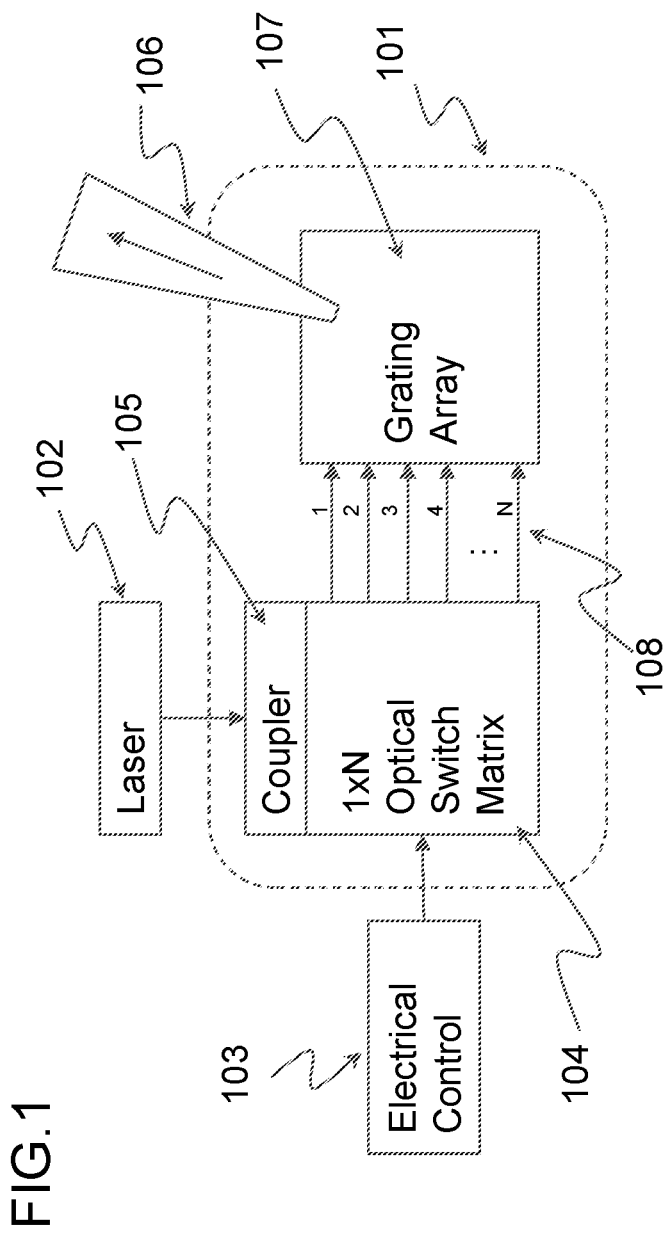
FIG. 1 depicts a functional diagram of an integrated thin optical beam scanner.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Optical energy flow in beam form is particularly useful in communication applications. Often, long distance free-space optical (FSO) communication utilizes optical beams to achieve long distance, high data rate, and high energy efficiency. Since optical beams confine optical energy into a designed limited space, high optical energy density can be realized at a distant location from the sender. This advantage is also valid for shorter distance FSO communication applications. For example, a FSO system designed for indoor office space usage can utilize an optical beam to achieve much higher communication data rate compared to the case using a widely diverging form of optical emitters. There has been technology development in short distance FSO communication recently. However, many FSO systems use widely diverging optical emitters to send the signal, causing the data rate to be limited to a lower rate. One of the limitations of a conventional optical beam system is its large physical size. Optical lens systems are commonly used to form and direct optical beams in FSO systems. Such lens systems have large sizes. It is difficult to fit them into devices used in short distance FSO communication, such as cell phones, tablets, laptop computers, and other handheld devices. Present embodiments enable the integration of optical emitters for beam-based FSO communication devices, which have optical beamforming and scanning functions, in a semiconductor chip format which has a thin and flat form factor. With the chip format of the present embodiments, an optical beam emitter for FSO communication can be integrated into handheld devices easily and can achieve high data rate with high efficiency.

Photonic integrated circuit (PIC) is a platform of optical devices built into a planar substrate. One of the common PIC platforms is a glass-based PIC. For example, an optical splitter used in a fiber-to-home application is commonly fabricated in this platform. Another PIC platform is a semiconductor-based PIC. Silicon photonics (SiPh) is an example of this platform using silicon wafers and silicon-based materials to fabricate PICs. SiPh can utilize the advanced silicon microfabrication technologies to achieve complex functions in a highly integrated format. PIC's main component is waveguides. An optical waveguide confines and directs the flow of optical energy inside. Often, a waveguide has a lineal form which confines optical energy in two-dimensional space and allows it to flow in another dimension, along the line shape. It is also possible to have a planar waveguide which confines optical energy in only one dimension and propagates it freely in the other two dimensions. With various waveguide designs, PIC components achieve functions such as splitter, isolator, and wavelength router. By adding electrical controls, PIC achieves switches, modulators and detectors. The present embodiments utilize mature PIC technologies to realize the thin and flat form factor of a thin optical beam scanner. Detailed descriptions of PIC can be found in, for example, "Principles of Photonic Integrated Circuits: Materials, Device Physics, Guided Wave Design" by Osgood (2021).

FIG. 1 depicts the function diagram of the PIC optical emitter system on a chip. This emitter forms optical beams and scans the optical beam in its field of view (FOV) according to electrical control signals provided. The optical beams 106 are formed by PIC grating output couplers 107. Each grating coupler is designed to form a specific optical beam shape in a specific direction based on a corresponding grating. An array of such gratings can cover the FOV of the emitter system with multiple optical beams that have different beam angles. The PIC die is indicated by the dotted box 101. Optical source(s) 102 is coupled into a waveguide to inject optical signal into the PIC system via coupling structure 105. Then the optical signal from optical source(s) 102 is introduced to an 1×N optical switch matrix 104 controlled by electrical signals from electrical control 103 provided from external systems.

N indicates the number of the output ports of the 1×N switch 104 and can be any integer larger than or equal to 2. By selecting one of the N output ports 108 of the switch matrix, which is connected to one of the grating couplers in the grating array 107, the optical signal is emitted in the specific direction designed into a grating coupler connected to the output port 108. By switching between N output ports one by one, optical beam scanning is achieved. This system does not include any bulk optics such as large refractive (traditional) lens systems. Due to the nature of the PIC platform, the form factor of the emitter is thin and flat, for example an about 1 mm thin chip is possible, which is dictated by the thickness of the semiconductor substrate, as PIC lensing using gratings does not add to the height. Since the beam shape and direction are determined by the grating design, the system designer has complete freedom to place the grating couplers anywhere on the emitter surface. This freedom makes it possible to optimize the grating design, placement, routing and device size to achieve the highest performance level. In the case of similar systems with lenses, they often require placement of out-couplers in specific locations on the surface since the position determines the direction of the beams. This requirement in lens-based systems limits the size of the device and its performance, such as the number of beams in the system.

An output coupler is a PIC structure which converts the optical energy in waveguides into an optical beam propagating in free space as an output of the beam scanner. A PIC grating structure is used since various designs are available and it has been used in the optical industry successfully. Grating couplers for a grating array 107 can be designed to emit optical Gaussian beams. A Gaussian beam is a type of beam which has preferable properties to transfer optical signal over distance. One of the properties is the beam shape over the propagation distance, as it holds unchanged the power profile over the propagation distance. To form a Gaussian beam, the optical power profile and phase profile need to be controlled. PIC grating designs that emit Gaussian beams have been reported. For example, Kim (2018) designed, fabricated and measured Gaussian beams from PIC gratings. According to the design, one grating has roughly an area of 300 µm×300 µm and emits the designed Gaussian beam with beam divergence of 0.2~0.5 degree HWHM (Half Width at Half Maximum). For indoor FSO communication purposes, the target beam diverges by a few degrees. If the same design is used, the size of the grating would be on the order of tens of µm. This size is suitable to form an array of gratings in a few-millimeter-by-few-millimeter area PIC chip.

Figure 2:
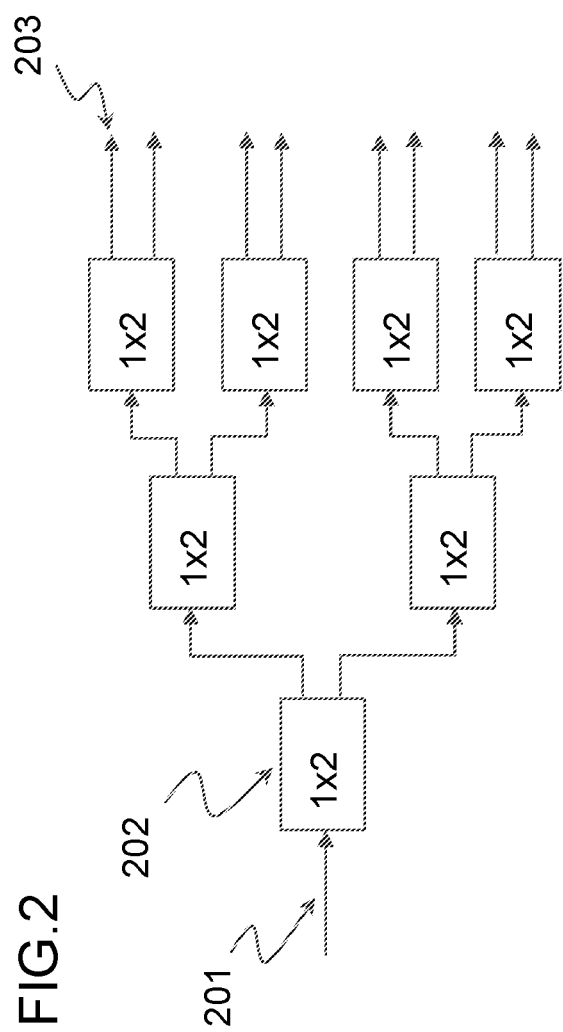
FIG. 2 depicts an 1×N optical switch matrix formed by cascading 1×2 optical switches.

Embodiments may include a M×N optical switch matrix, where M is an integer indicating the number of input ports. The M×N optical switch matrix may be used to select one or a few of the gratings in the grating array to emit optical signals in the intended direction with the designed beam shape. M is usually equal to 1, as only a single light source is typically used. However, it is possible to use multiple light sources (M>1) in the system with proper switch design if it is advantageous. The 1×N optical switch matrix can be implemented by cascading 1×2 optical switches, as depicted in FIG. 2. A 1×2 optical switch is a device that has one optical input, two optical outputs, and a control mechanism, often electric control. By adjusting the electric control, the input optical signal exits out of one of the two optical outputs. For simplicity, FIG. 2 shows an exemplary case of a 1×8 switch implemented by a cascade of 3 stages of 1×2 switches. The stage is the level of the cascade. The first stage includes only one 1×2 switch at the optical signal input side.

In FIG. 2 the first stage is the leftmost level, a single 1×2 switch 202. The second stage includes the 1×2 switches connected to the outputs of the first stage. It has 2 switches in the middle of FIG. 2. The third stage includes the switches connected to the outputs of the second stage. The cascade connects switches in this manner, with the nth stage including $2^{(n-1)}$ 1×2 switches where n is the stage number, starting from 1 for the first stage. By adding more stages, a larger $1×2^n$ switch can be built, and again, n is the number of stages. By switching a 1×2 switch at each stage, one output port among N outputs 203 has the optical signal from the input port 201. A 1×2 optical switch can be realized using various devices such as a Mach-Zehnder interferometer (MZI) or multimode interferometer (MMI). In a MZI 1×2 switch, the optical signal of a single input port is split into two optical signals of essentially equal power in two branches of waveguide, then the relative phase between the optical signals in the two branches is changed. The combined optical signal flows into one of the two output ports by interference of the signals from the two branches at the output. For example, Jalali (1997) reported this type of optical switch on a Si PIC platform. Other types of PIC 1×2 (or 2×2) switches can also be used for the elemental 1×2 devices in the switch matrix. The cascaded structure can also use 1×3 (or 1×4, 1×5, etc.) optical switches as the elemental devices. The structure concept is the same as the 1×2 switch matrix structure, where all the output ports of the previous stage are connected to the input ports of the switches of the next stage. It is also possible to mix switches with a different number of outputs. If there is more than one optical source, the system could have an M×(1×N) optical switch matrix, which is merely an M quantity of 1×N switch matrices used in parallel. For FSO communication purposes, there may not be any advantage to having an M×N switch matrix, as an M×(1×N) switch matrix is sufficient to achieve full scanning capability.

The 1×N optical switch matrix is controlled by electrical signals provided from external systems. The switch path control mechanism depends on the form of the 1×N optical switch matrix. Here, we consider the 1×N optical switch matrix constructed by cascaded 1×2 switches as described in previous sections and FIG. 2. For this particular form of 1×N switch matrix, an electrical signal is required for each 1×2 optical switch along the designated path of the optical signal. The simplest method to control the switch matrix is to have an electrical control signal for each one of the 1×2 switches in the matrix. However, this is not preferable since it requires a large number of electrical contacts and wiring, which is expensive and makes the size of the chip large. A $1 \times 2^n$ switch matrix requires $2^n - 1$ switches. For example, a 1×128 switch matrix (n=7) has 127 1×2 switches in the matrix. This means the individual control method requires 127 control signals that need to be provided from the external system and wired to each switch separately.

Figure 3:
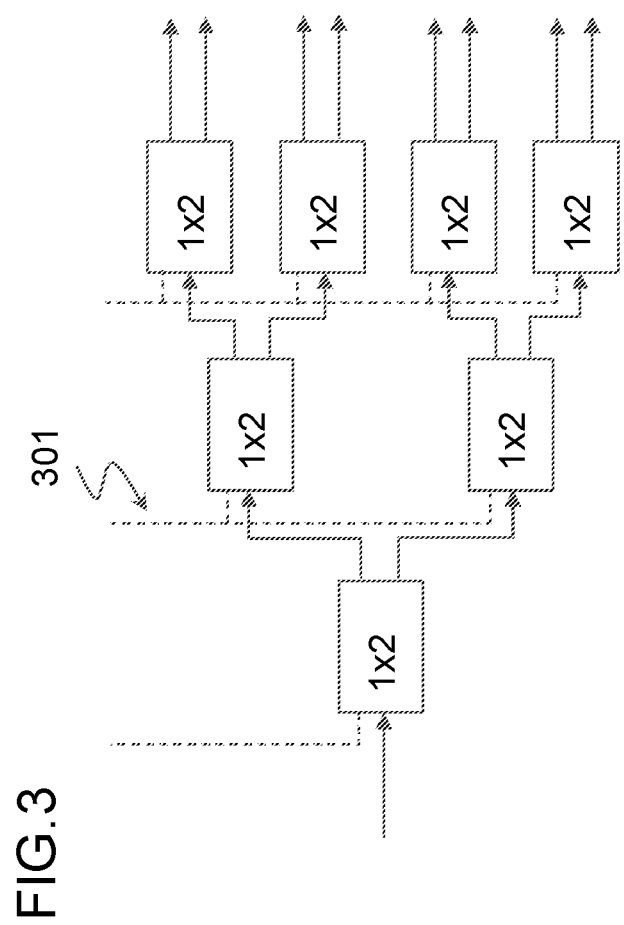
FIG. 3 depicts an 1×N optical switch matrix with shared electrical control signals.

Another method is to apply the same control signal for all the 1×2 optical switches at the same stage of the cascade as depicted in FIG. 3, where the electrical control lines are shown as dashed lines. Consider a 1×2 switch that requires a digital signal to determine the optical output ports from two possibilities, right or left output port (L/R) by high or low voltage signal. A single electrical line connects all the switch's control signal input pins of the switches belonging to the same stage of cascade. For example, the electrical control line 301 is connected to the two 1×2 switches in the middle, all switches in the second stage of the cascade, with the same control signal. At each stage of the cascade, only one switch receives the optical signal, then only one control signal is required for each stage to make the 1×N switch to work. This method reduces the number of wires and pins that need to be connected to external electronics. As a comparison, a 1×128 switch control requires only 7 control signals compared to 127 for the individual control method described above. However, since all switches are active and switching, many switches consume power unnecessarily even if there is no optical signal input.

Figure 4:
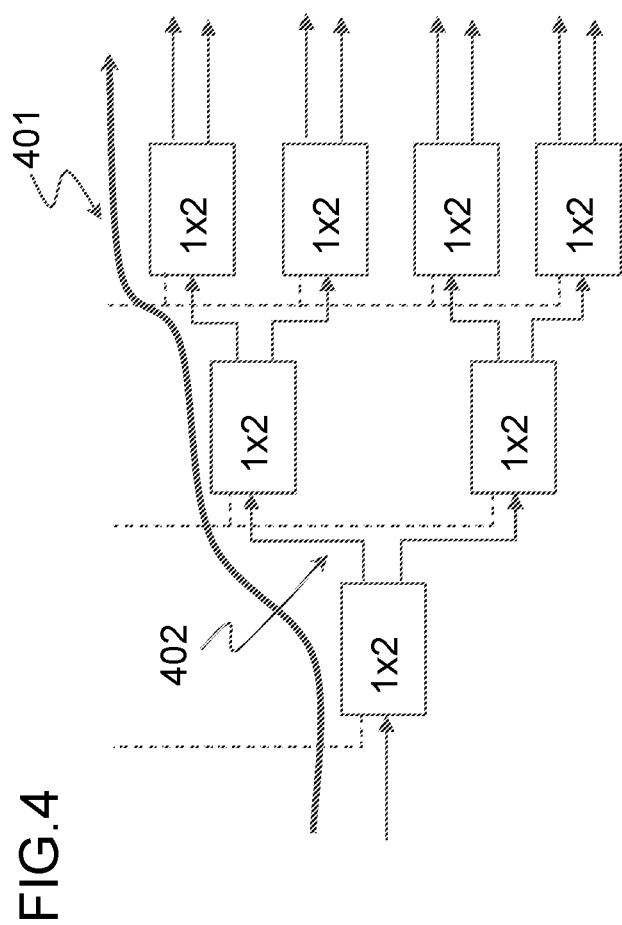
FIG. 4 depicts an 1×N optical switch matrix with a shared electrical control signal that is selecting a particular output port.

FIG. 4 shows one case in which all switches are on and consume power, when only 3 need to operate for the actual switching function. If the top output port of 1×2 switch 402 is the output requiring electrical power consumed at the switch, the path 401 requires all top 1×2 switches in the cascade to be ON and consuming power. Since all switches are in the same state, all switches are ON and consuming power.

Figure 5:
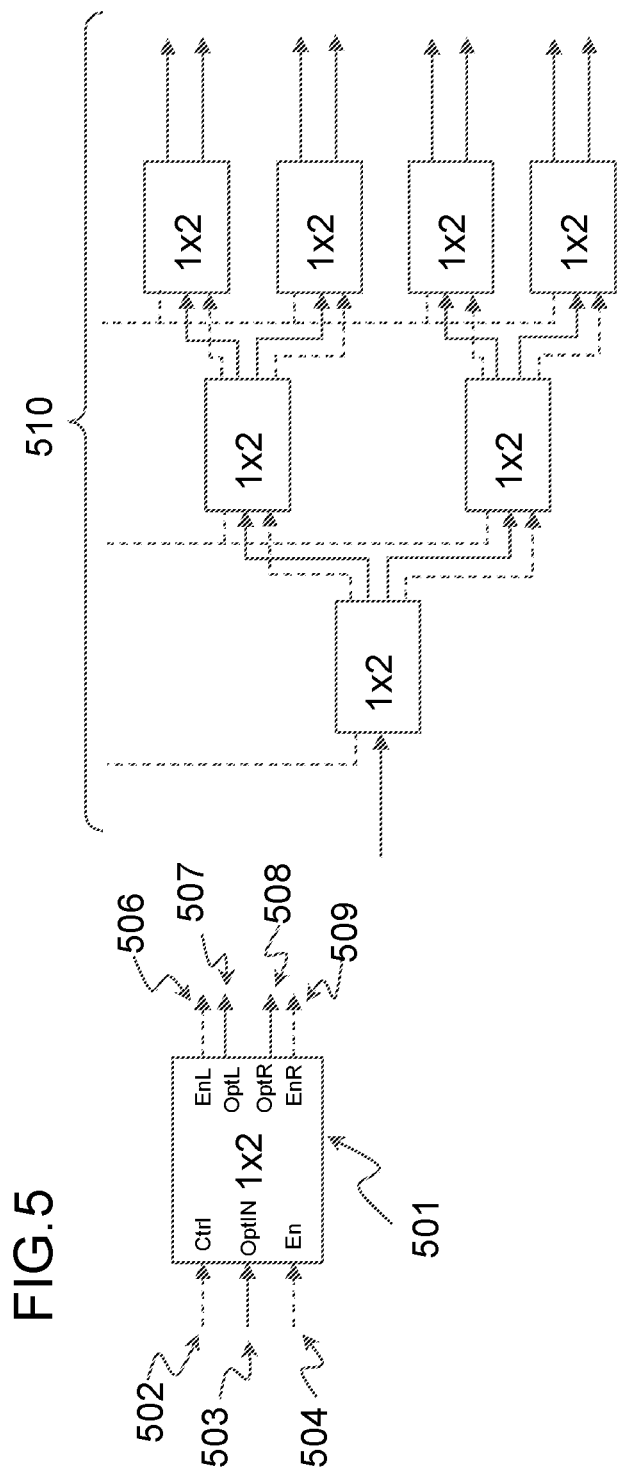
FIG. 5 depicts a 1×2 switch unit with electrical enable signals and 1×N switch matrix using the switch.

The lowest cost and most power efficient control method is to include an electrical enable signal for the switch control and to propagate the electrical enable signal along with the optical signal. One such system is shown in FIG. 5. This method requires a small number of pins for control signals, one for each stage of the cascade, and activates only the switches required for the targeted optical path so that it has lowest power consumption.

In FIG. 5, on the left-hand side, a 1×2 optical switch 501 with all control pins is shown. The optical signal is indicated as a solid line, and the electrical signal is indicated as a dashed line. One optical input signal is coming from the left and entering the optical input port, (OptIN, 503). Two optical outputs are on the right-hand side (OptL, 507 and OptR, 508). Depending on the electrical control signal, the optical signal exits one of the two output ports. Four electrical signals are shown for the unit switch, a control signal (Ctrl, 502) determines the optical output port (OptL, 507 and OptR, 508), an enable signal (En, 504) activates the switch, two output enable signals (EnL, 506 and EnR, 509) carry enable information to the following switches in the switch matrix. A 1×2 switch is active or functions only if the input enable signal for that specific 1×2 optical switch 501 is ON. The output enable signal is ON only when there is an optical signal output on the output port. This means that the electrical enable signal flows along the same path as the optical signal, and activates only the switches on the path. In embodiments, the optical signal may travel through the switch matrix before the electrical enable signals flows into the switch matrix. Accordingly, there may be a period of time where the optical signal is not able to flow through the entire switch matrix due to the slight time lag of the electrical enable signal through the switch matrix. This process may enable only the transistors for the optical switches along the flow path are turned on during signal processing while the transistors for the optical signal that are not along the flow path are turned off.

An example of a 1×8 switch matrix 510 using the switch unit with enable signal is shown in FIG. 5. Inside a 1×2 switch shown in FIG. 5, there are two electrical functions controlling the state of the 1×2 switch. The first is a logical circuit module which handles control signals and enable signals. The second is a transducer to provide electrical power for the switching mechanism. The transducer circuit is preferred to be located near the 1×2 optical switch PIC structure, however the logic circuits can be placed anywhere on the chip as long as the wiring can be done easily and efficiently.

Figure 6:
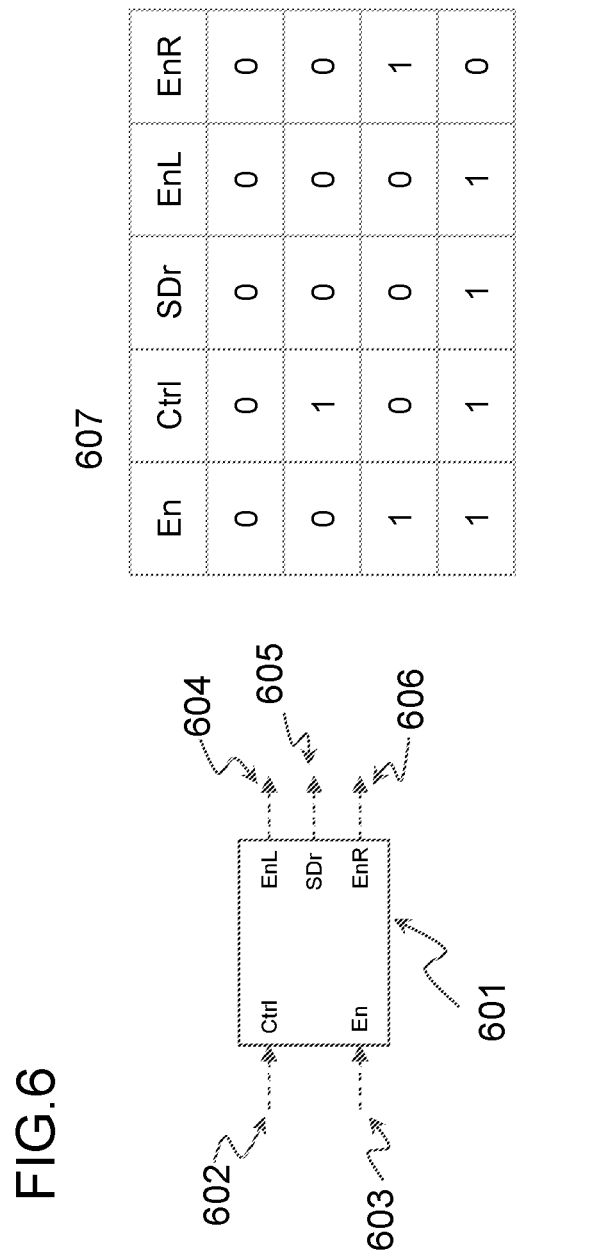
FIG. 6 depicts an electrical switch control module's pin diagram and the truth table.
Figure 7:
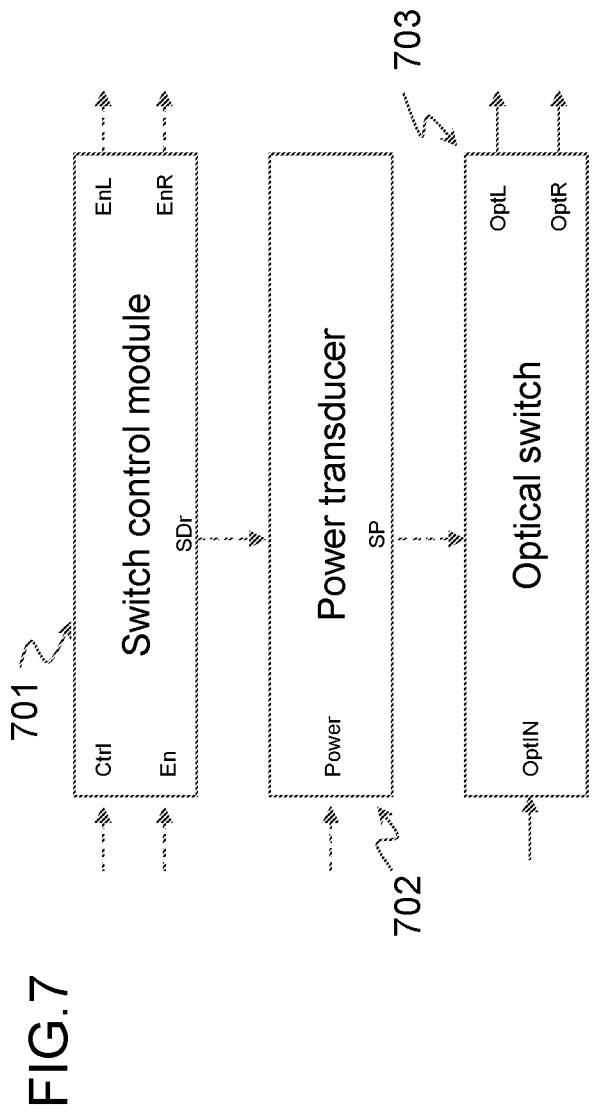
FIG. 7 depicts a functional diagram of a 1×2 optical switch with electrical control.

To enable a single device based optical switch matrix control method, a switch control module of a 1×2 optical switch is designed. This is the logic part of the switch control described in the previous section. FIG. 6 depicts the pin diagram 601 of the control module and a truth table 607. Two inputs are control signal input (Ctrl, 602) and enable signal input (En, 603). The control signal is directly connected to the pad of the external control signal. The enable pin signal is used to adjust the state of the control module. Three outputs are: switch power driver (SDr, 605), enable right (EnR, 606) and enable left (EnL, 604). The switch power driver is a control signal that determines the state of the transducer which turns ON/OFF the electrical power for the 1×2 optical switch which determines the output port for the optical signal. The enable output depends on the state of the 1×2 optical switch which is the state of SDr pin of the module. If the input enable pin is "0", all the output pins are "0" too, that means that this switch is OFF state without any power consumption and also makes all following switches in the matrix to OFF state as well. It is straightforward to design an integrated electrical circuit to implement the electrical switch control module's truth table. It is estimated that less than 20 transistors are required to realize the module's function, which has reasonable size to co-integrate with PIC components. A complete 1×2 optical switch diagram with the control module is depicted in a diagram in FIG. 7. The electrical switch control module 701 generates digital signals SDr, EnL, and EnR based on the input signals Ctrl and En. The power transducer circuit 702 regulates the electrical power required to make the switching function at PIC optical switch 703. Again, especially for slow switching, the location of the control module is not important. This freedom makes it easy to co-integrate PIC and integrated electrical circuits on the same chip.

So far, the configuration and control of the 1×N optical switch matrix is based on a cascaded 1×2 optical switch. However, one can design a 1×N optical switch matrix constructed with, for example, a combination of 1×2, 1×3, 1×4 switches. These optical switch sub-modules can have any number of output ports if it is advantageous. There is no limit for the number of input ports too, but a sub-module with a large number of ports may not have advantage over a simple system with 1×2 optical switch sub-module. The above electrical control module can be used to control such a 1×N optical switch matrix also. In the case of a 1×3 optical switch, the electrical control module must have 3 enable outputs corresponding to the 3 optical outputs. The control signal may include more than 1 pin to handle the number of outputs properly. For example, in the case of a digitally controlled 1×3 switch, 2 bits control signal is required. The switch power driver pin design may have more than 1 pin for a specific optical switch mechanism. With the proper modification of the electrical control module, the lowest power consumption operation can be achieved by propagating the enable signal along the same path as the optical signal, as described for 1×2 optical switches.

As an example of a 1×N optical switch in different form from cascaded 1×2 switches, an optical phased array (OPA) based approach is described here. An OPA can form an optical beam by adjusting the phases of optical signals emitted from multiple optical antennas, following the same operation principle of an RF (radio frequency) phased array operating at microwave wavelength. An OPA can be implemented in PIC format. Using an OPA's beam scanning capability, a PIC-OPA-based 1×N switch can be implemented. In one embodiment, one input waveguide is connected to a splitter which splits the optical signal from the input port into multiple branches. The branch waveguides include a mechanism to control the phases of the optical signals passing through them. After phase control, the branch waveguides are connected to a free-propagation region (FPR) which is a larger planar waveguide confining optical signals in only one dimension. The branch waveguide outputs to the FPR are arranged at one end of the FPR so that the emitted optical power from all branch outputs overlap at the other end of the FPR. By adjusting the phase of the optical signal in each branch, a beam is formed in the FPR and propagates to the other side of the FPR. On the receiving end of the FPR, multiple (N) output waveguide ports are placed strategically and capture the optical signals. By changing the phase relationship between branches, this structure functions as a 1×N optical switch, with the OPA beam coupling to a selected output waveguide port. Since it requires fewer steps along the optical path, the loss of optical power could be less compared to the cascaded 1×2 switch design. It could also be smaller in physical size. However, each branch needs careful control of phase, which requires many control pins.

For lower cost and smaller size, co-integration of PIC and the control electrical circuits is preferred. Technology development to achieve this integration has been reported. For example, Lee (2014) reported monolithic integration of PIC 8×8 optical switch fabric and its electrical control on a single silicon chip. Using a 90 nm silicon process, Lee integrated multi-staged, Mach-Zehnder 2×2 optical switches, CMOS logic circuits and device driver circuits monolithically. Utilizing such an approach, the entire optical beam scanner system of the present embodiments can be co-integrated on a single semiconductor chip.

The beam scanner system can be fabricated on separate substrates when it is advantageous in terms of cost, size, or performance. For example, the passive PIC and active PIC sections can be on separate substrates to lower the total fabrication cost. The passive PIC substrate may include the grating output couplers. The active PIC substrate may include the 1×N optical switch matrix and the electrical control modules. The laser die should be mounted on the active substrate in this case. Since the passive PIC fabrication process is much simpler, the total fabrication cost of such separate substrate systems could be lower. However, the substrates need to be aligned precisely and bonded closely to assemble the beam scanner. The assembly cost could be high enough to cancel the advantage of lower fabrication cost. The total cost needs to be considered carefully.

At least one optical source, a laser, is required for the optical beam scanner to provide optical signal/energy. The source can be coupled to the scanner die in monolithic form, hybrid form or externally coupled form. Monolithic integration is a method in which the laser is fabricated into the same semiconductor chip. Although there are reports about such integration in research journal articles, so far this is a difficult and costly option. The externally coupled form is to use an external laser that is connected to the scanner die via an optical fiber. This method can choose many types of laser available in standalone format. However, it is expensive and large. It is common in PIC to utilize hybrid methods to integrate a laser die to a PIC die. In the hybrid method, a separately fabricated laser die is attached to the PIC die and coupled to a PIC waveguide via a coupling structure such as grating and mode converter.

Figure 8:
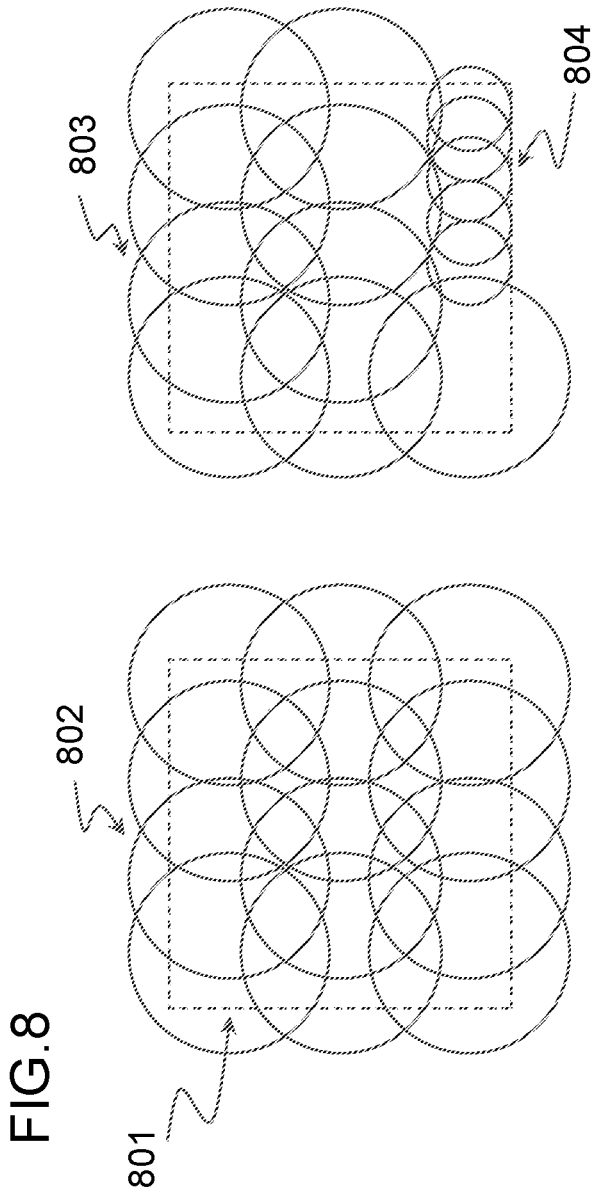
FIG. 8 depicts examples of coverages of the scanner field-of-view with optical beams Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

One of the advantages of the present embodiments is the flexibility of beam design. Since the grating coupler alone determines the beam characteristics, many different types of beams can co-exist in the single beam scanner. FIG. 8 illustrates two cases of FOV coverage by multiple beams from corresponding output gratings. On the left side, the simplest case is shown. The FOV indicated by a square with dotted line 801 is fully covered by beams with identical circular shape with different angles 802. Each beam is from a specifically designed grating coupler for the shape and angle. In the FIG. 8, 12 beams cover the FOV. By selecting beams sequentially, the scanner scans the FOV with the optical beam. With the present embodiments, both the angle and the shape can be designed for each beam.

On the right of FIG. 8, another beam configuration is shown. In this case, most of the beams have the same size 803 as in the left case, but some beams 804 at the bottom-right-hand corner of the FOV have a smaller beam size for a higher resolution. The scanner can have several beams in the same direction with different shapes also. For example, if it is advantageous, beams with various divergences can be designed in the grating array. By selecting a specific grating out coupler, the scanner can adjust the size of the output beam. This is equivalent to adjusting the focus of a lens system, which is done usually by moving lenses in the lens system. With the present embodiments, such an adjustment can be done completely internally on a PIC chip without moving any components. It is also possible to combine multiple beam outputs. After the output from the 1×N optical switch, an optical splitter can be added and connected to a grating sub-array. The sub-array can include multiple gratings, each designed for different beams which will be combined together to form a specific output beam shape. As long as the scanner chip size allows, any type and combination of beams are possible with the present embodiments. This flexibility of beam design allows efficient and high-performance beam scanning operation.

To utilize a PIC grating as the beam output coupler, it is required to use a coherent light source for the beam scanner. Because of the coherent nature of the optical beams, they can interfere with each other if beams from multiple gratings are placed onto the same location in space. The interference could cause formation of undesirable beam shapes. For example, the interference pattern of multiple beams could make a large hole in the beam where not much optical energy can be transferred, i.e., no communication in the case of FSO communication applications. Note that this issue may only be present only when multiple gratings are used to form a designated beam shape at a time. If a single grating is used, there is no unwanted interference. There are two methods to mitigate this interference problem. One is to reduce the overlap of multiple beams from gratings. When there is no overlap of optical beams from gratings, there is no interference. Then the overall beam shape is the sum of all the beams from gratings used as designed. Another method is to place gratings on the die with a larger separation. When the separation of gratings is much larger than the wavelength used, the interference pattern oscillates with high spatial frequency. This creates an overall, envelope shape of the beam closer to the sum of the beams used. Even though there are still oscillations or interference patterns, the high frequency pattern can be averaged over a proper size detection system. In the case of a complex beam shape, a combination of these two methods can be used to reduce the unwanted interference pattern.

Similar optical beam scanner designs have been reported. For example, Inoue (2019) or Hoseini (U.S. Pat. No. 11,150,411) reported an optical beam scanner with a PIC optical switch, a grating output coupler and an optical lens system. However, there are fundamental differences. First of all, their system requires a collimating lens after the grating out coupler, while the present embodiments do not require any optical system after the grating. Secondly, since the lens system has a collimating and imaging function, all the grating elements must be at a specific location of the PIC surface, while this is not the case for the present embodiments, where gratings can be anywhere on the PIC surface as long as their wiring makes sense in terms of cost and size. Furthermore, without the flexibility of grating location and requirements for lens systems, such a scanner with a lens system has limited capability of mixing and combining different types of beams in one system. Their scanner has a simple control signal configuration. The propagating enable signal configuration of the present embodiments achieves lower power consumption compared to the scanners of prior art.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An optical beam scanning semiconductor device comprising:
    at least one optical source coupled to a waveguide via a coupling structure;
    at least one electrically controlled optical switch matrix, the optical switch matrix having one input waveguide for receiving an input optical signal from the at least one optical source, and a plurality of output waveguides, wherein the optical switch matrix is configured to direct said input optical signal to one of the plurality of output waveguides, the optical switch matrix having a plurality of optical switches forming a plurality of discreet and independent optical flow paths;
    at least one electrical control module with a propagating enable signal configured to follow a selected optical path of the optical switch matrix, the selected optical path extending from the input waveguide to the one of the plurality of output waveguides;
    a plurality of optical grating output couplers, each of the plurality of optical grating output couplers being connected to a different one of the plurality of output waveguides of the optical switch matrix, wherein each of the plurality of the grating couplers being designed to emit a specific optical beam shape toward a specific direction.

2. The device of claim 1, wherein the at least one optical source is a semiconductor laser die attached to a surface of the semiconductor die where the optical switch matrix is fabricated.

3. The device of claim 1, wherein the at least one optical source is a laser module connected to the input waveguide of said optical switch matrix via an optical fiber.

4. The device of claim 1, wherein the optical switch matrix comprises cascaded 1×2 optical switches, wherein each of the 1×2 optical switches not on the selected flow path are not enabled, and each of the 1×2 optical switches on the selected flow path are enables, wherein there are fewer enabled 1×2 optical switches than not enabled 1×2 optical switches.

5. The device of claim 4, wherein the 1×2 optical switches are selected from a set of structures comprising but not limited to:
    Mach-Zehnder interferometer;
    Directional coupler;
    Multimode interference coupler.

6. The device of claim 5, wherein electrical control of the 1×2 optical switches utilizes a thermo-optical or an electro-optical transducer structure.

7. The device of claim 1, wherein the optical switch matrix comprises a combination of 1×2, 1×3, 1×4, . . . 1×L optical switches in a cascaded structure.

8. The device of claim 1, wherein the optical switch comprises an optical phased array switch.

9. The device of claim 1, wherein the plurality of optical grating output couplers are configured to emit Gaussian beams.

10. The device of claim 1, wherein the plurality of optical grating output couplers are configured to emit optical beams with different output angles relative to each other in order to achieve the coverage of the field-of-view of the device.

11. The device of claim 1, wherein the plurality of optical grating output couplers are configured to emit optical beams with various beam widths.

12. The device of claim 1, wherein the plurality of optical grating output couplers includes groups of the gratings designed to emit the same beam.

13. The device of claim 1, wherein at least one of the output waveguides of the optical switch is connected to an optical splitter, the optical splitter having a plurality of optical splitter outputs, wherein the plurality of optical splitter outputs are connected to the grating output coupler.

14. The device of claim 13, wherein gratings of the grating output coupler are sufficiently separated to avoid interference specified by a used wavelength.

15. The device of claim 13, wherein gratings of the grating output couple are configured to have minimum overlap between output beams.

16. The device of claim 1, wherein the optical switch matrix, the electrical control modules of the switch matrix, and the grating output couplers are fabricated on the same substrate.

17. The device of claim 1, wherein the optical switch matrix and the electrical control modules are fabricated on a first substrate, and the grating output couplers and passive splitters are fabricated on a second substrate.

18. The device of claim 1, wherein a coupling structure that couples the optical input and the input waveguide is selected from a set of structures comprising but not limited to:
    a grating structure in the semiconductor die;
    an edge mode converter;
    a lens.

* * * * *